June 19, 1951          J. T. VOORHEIS          2,557,327
TEMPERATURE RESPONSIVE CONTROL FOR FUEL OIL HEATERS
Filed Aug. 20, 1948
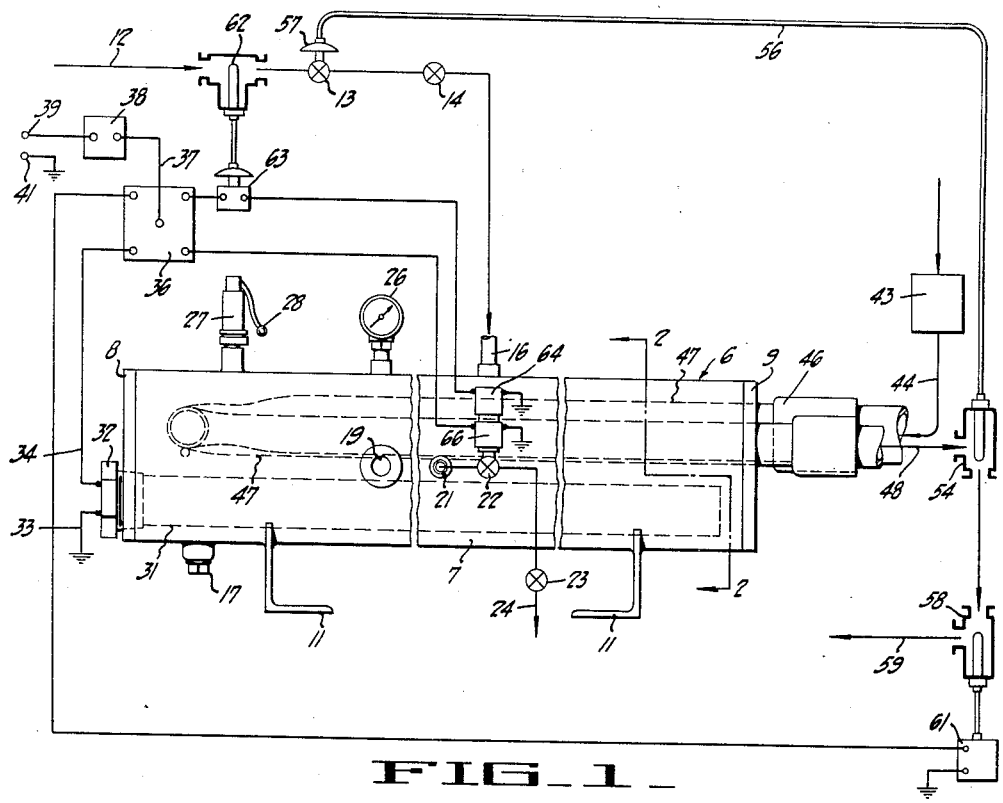
FIG_1_
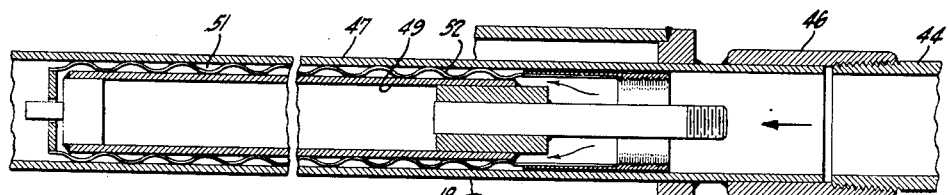
FIG_3_
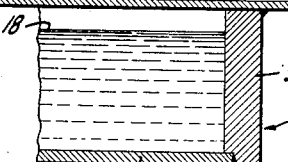
FIG_2_
INVENTOR.
Joseph T. Voorheis
BY
       ATTORNEY Patented June 19, 1951

2,557,327

UNITED STATES PATENT OFFICE 2,557,327

TEMPERATURE RESPONSIVE CONTROL FOR FUEL OIL HEATERS

Joseph T. Voorheis, Piedmont, Calif., assignor to The Coen Company, San Francisco, Calif., a corporation of California Application August 20, 1948, Serial No. 45,369

3 Claims. (Cl. 257—2)

My invention relates to means for use especially in heating fluids and particularly for use in heating oil which is subsequently to be burned as fuel. Such heaters are very often installed in connection with burners useful in the generation of steam or in other locations where a steam supply is available. It often happens, however, that the burners utilizing the fuel oil must be started or maintained under circumstances during which time there is not steam available. Furthermore, if the amount of attention and regulation required for an oil heater is great, its usage may be uneconomical or even undesirable. It is considered, however, to be an advantage to heat fuel and as a matter of fact it is necessary to heat some of the heavier grades of oil used as fuel.

It is therefore an object of my invention to provide a fuel oil heater of improved characteristics.

Another object of my invention is to provide a fuel oil heater which is substantially automatic in its operation.

An additional object of the invention is to provide a fuel oil heater effective to heat fuel with or without an available supply of steam.

An additional object of the invention is to supply a fuel oil heater in which the transfer of heat to the fuel oil is extremely effective and economical.

A still further object of the invention is to provide a fuel oil heater readily manufactured of simple components and which can readily be attended to, if service is necessary, by ordinary means and methods.

Other objects together with the foregoing are attained in the embodiment of the invention illustrated in the accompanying drawing in which Figure 1 is a diagrammatic showing of a fuel oil heater installed in accordance with my invention, the heater itself being shown substantially in side elevation.

Figure 2 is a cross-section, the planes of which are indicated by the lines 2—2 of Figure 1.

Figure 3 is a cross-section, the plane of which is indicated by the line 3—3 of Figure 2.

In its preferred form, the fuel oil heater of my invention comprises a housing in which a water level is automatically maintained, the water being preferably derived from external steam and the interior of the housing being at a temperature to support the presence of steam at a predetermined pressure. The amount of liquid in the heater is automatically controlled either in accordance with the fuel oil temperature or with the incoming steam temperature or both. In the event the external steam is not readily available, an electric heater is supplied for heating the water to make steam internally, the heater itself being automatically controlled in accordance with the temperature of the issuing oil. The oil is heated by passing through an oil conducting tube having convolutions within the housing in the steam space, and arranged so that oil circulating through it derives sufficient heat from the steam to cause condensation of part of the steam, the condensate supplying additional water to the housing.

While the fuel oil heater of my invention can readily be embodied in many different forms and its construction changed from time to time in accordance with specific installations, it has been successfully incorporated in the particular form shown and described herein. In this form there is provided a housing 6 including an outer tubular member 7 having heads 8 and 9 at the opposite ends thereof to provide a closed, pressure tight vessel. The vessel is mounted on suitable brackets 11 for support on any appropriate surface and is usually installed in a location wherein there is available a steam supply line 12. Steam from this supply line is utilized to afford heating steam and water for the fuel oil heater. For this reason the steam line 12 is continued through a throttle valve 13 and a check valve 14, of the customary type, to a connector 16 in the upper side of the housing 6. Steam flowing into the housing condenses therein and forms a water deposit. While a drain plug 17 is afforded for cleaning and general overhaul purposes, normally it is seated. Since there is no outlet for the water, it continues to rise inside of the housing 6 as condensate is added until such time at least as it achieves a predetermined level indicated by the line 18 in Figures 2 and 3. The water level is visible on the exterior of the housing through a water glass 19 and is maintained at that level by an overflow opening 21 connected through a valve 22 and a hand valve 23 to an overflow pipe 24 from which the water is discharged. When the valves 22 and 23 are both open, the water level within the housing is maintained substantially at the plane of the line 18. In the event the steam entering the chamber 6 comes in at a temperature too great completely to condense, then the pressure within the housing 6 is built up as shown by a conveniently attached gage 26. The pressure of the steam is restricted to a maximum amount by a relief valve 27 of the customary kind set to pop off or blow at all pressures above a predetermined pressure. A handle 28 is available for manually reducing the steam pressure at any time.

In the event the apparatus is to be started from cold under circumstances where there is no steam available from the conductor 12 or in the event steam in general is not available, I provide an auxiliary means for affording the requisite hot fluid within the housing 6. Disposed substantially lengthwise in the housing is an electrically operated heating tube 31 mounted on a plug 32 screwed into the head 8 and provided with electrical connections 33 and 34 so that the heating element is supplied with electricity. The conductor 33 is grounded and the conductor 34 extends to a main control box 36. That in turn is connected by a wire 37 to a transformer 38 joined to a terminal 39 extending to a source of power, the other side of the circuit being represented by a conductor 41 connected to ground. When the control box 36 permits current to flow, the heater 31 is energized and water within the housing 6 is converted into steam at the requisite pressure as set by the relief valve 27. Since the temperature of the steam corresponds to the pressure thereof, there is likewise established a predetermined temperature within the housing 6.

The heat within the housing, either furnished by the steam from the conductor 12 or the electric heater 31, is utilized to heat oil. Oil from any suitable source such as a pump 43 is forced through a pipe 44 into an inlet connection 46 to an oil conducting tube 47. This tube extends through the head 9 and is convoluted within the housing 6 above the water level 18 therein, that is, it is in the steam space of the housing, and eventually emerges through the head 9 to an outlet duct 48. The oil from the pump 43 consequently flows completely through the housing and back out again. In order for the oil to be in good heat exchanging relationship with the ambient steam and in order to provide a large heat exchange surface but to maintain a high oil flow rate or velocity, the interior of the relatively large tube 47 is provided as shown in Figures 2 and 3 with an inserted tube 49 to leave an annular space 51 between it and the external tube 47 so that there is a relatively thin film of advancing oil within the exterior tube. In addition a member 52 of expanded metal is disposed within the annular space 51 to impart additional turbulence to the flowing oil. Since the oil entering through the tube 47 is relatively cold, it absorbs heat through the tube from the surrounding steam and causes condensation of such steam. The heat liberated by the condensation of the steam is many times that which would be given up by a mere temperature drop in steam itself and hence a substantial transfer of heat from the steam to the oil is effectuated. This makes it possible to reduce very substantially the amount of surface required for the convoluted tube 47 and even so provides the desired temperature rise in the quantity of oil flowing therethrough. Condensate drops from the tube and hence does not hinder heat flow.

The heated oil discharged through the duct 48 passes through a temperature responsive device 54 connected by a transmission pipe 56 to a controller 57 for the valve 13. Since the valve is a steam throttle, there is thus provided a mechanism for controlling the quantity of steam supplied to the heater in accordance with the temperature of the oil emerging therefrom. That is, if the oil emerges at higher than desired temperature, the amount of steam required is reduced and vice versa. In this way the temperature of the outgoing oil is carefully regulated.

In a similar fashion, in the event the steam supply is not available or in the event the electric heater is utilized in addition to the steam supply or in any case wherein the electric heater is utilized, the outflowing oil passing through the temperature responsive member 54 then travels through a second temperature responsive member 58 before coming to its outlet 59. The member 58 controls an electrical switch 61 effective through the control box 36 upon the heater 31 so that when the oil temperature is too high, the heater is turned off and vice versa. Thus either the steam quantity or the quantity of electric heat is made responsive to the temperature of the outgoing oil.

An additional control is provided for the steam mechanism in that in the line 12 is disposed a temperature responsive element 62 effective to govern a switch 63 between the main switch 36 and a solenoid 64 controlling the valve 22. The arrangement is such that while the hand valve 23 is normally open, the valve 22 is closed in the event no steam is flowing. When, however, the steam flows through the line 12, the temperature of the responsive mechanism is increased, the switch 63 is closed, the solenoid 64 is energized and the valve 22 is open permitting a discharge of excess condensate through the overflow 21 so that the level 18 is always maintained.

In addition, and especially when the supply of heat comes from the heater 31 rather than steam from the line 12, there is provided an additional solenoid 66 effective upon the overflow valve 22 so that when the heater 31 is operating, the master control 36 not only energizes the heater 31 but also energizes the solenoid 66 and produces the same effect upon the valve 22 as does the solenoid 64. Depending upon the conditions of installation and operation from time to time there may be a water flow through the pipe 12 instead of a steam flow. In any case, however, the flowing oil is heated by available steam either alone or supplemented by the electric heater 31 or a supply of water is heated by the electrical heater. Since steam condenses in thermal relationship with the oil flowing through the heater, higher temperature is imparted to it. Furthermore the steam supplying system and the electrical heating system can be utilized simultaneously or separately. The oil for fuel is readily heated by the condensation of steam and the size of the heater, the amount of heat transfer surface necessary, and the general complexity of the mechanism are very much reduced over previous practice. Furthermore, the structure is all automatic in its operation and functions for protracted periods under widely varying conditions to supply a substantially uniformly heated quantity of oil for combustion.

I claim:

1. A fuel oil heater comprising a housing, means for supplying water in the form of steam to said housing, a water drain at a predetermined level in said housing, a valve controlling said drain, an oil conducting tube passing through said housing above said level, and means responsive to the temperature of oil flowing through said tube for controlling said valve.

2. A fuel oil heater comprising a housing, means for supplying water in the form of steam to said housing, a water drain at a predetermined level in said housing, a valve controlling said drain, an oil conducting tube passing through said housing in heat absorbing relationship with said steam therein, and means responsive to the temperature of steam in said supplying means for controlling said valve.

3. A fuel oil heater comprising a housing, means for supplying water in the form of steam to said housing, a water drain at a predetermined level in said housing, a valve controlling said drain, an oil conducting tube passing through said housing in heat absorbing relationship with said steam therein, means responsive to the temperature of oil flowing through said tube for controlling said valve, and means responsive to the temperature of steam in said supplying means for controlling said valve.

JOSEPH T. VOORHEIS.

REFERENCES CITED

The following references are of record in the file of this patent:

UNITED STATES PATENTS

| Number | Name | Date |
|---|---|---|
| 1,723,082 | Schumann | Aug. 6, 1929 |
| 2,223,551 | Carson | Dec. 3, 1940 |
| 2,354,932 | Walker et al. | Aug. 1, 1944 |

FOREIGN PATENTS

| Number | Country | Date |
|---|---|---|
| 444,919 | Germany | May 27, 1927 |